(12) United States Patent
Hill

(10) Patent No.: US 6,619,890 B2
(45) Date of Patent: Sep. 16, 2003

(54) BROACHING

(75) Inventor: Christopher P R Hill, Bristol (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/908,568

(22) Filed: Jul. 20, 2001

(65) Prior Publication Data

US 2002/0012573 A1 Jan. 31, 2002

(30) Foreign Application Priority Data

Jul. 28, 2000 (GB) .............................. 0018637

(51) Int. Cl.$^7$ ................................ B23P 15/42
(52) U.S. Cl. ............................. 407/13; 407/15
(58) Field of Search ................ 407/13, 14, 15, 407/16, 17, 18, 19; 409/249

(56) References Cited

U.S. PATENT DOCUMENTS

| 2,173,074 | A | * | 9/1939 | Romaine |
| 3,641,642 | A | * | 2/1972 | Schmidt |
| 3,858,482 | A | * | 1/1975 | Scaduto |
| 3,971,114 | A | * | 7/1976 | Dudley |
| 4,012,829 | A |   | 3/1977 | Dvorov et al. |
| 5,257,886 | A | * | 11/1993 | King ........................ 409/249 |
| 5,311,654 | A | * | 5/1994 | Cook ........................ 29/447 |
| 5,503,506 | A |   | 4/1996 | Yuan |
| 5,613,812 | A | * | 3/1997 | Levan et al. ............... 409/136 |
| 5,820,320 | A | * | 10/1998 | Kobari et al. .............. 409/249 |

FOREIGN PATENT DOCUMENTS

| GB | A 2 271 949 | 5/1994 |
| JP | 9-309023 | 12/1997 |

* cited by examiner

Primary Examiner—Derris H. Banks
Assistant Examiner—Ali Abdelwahed
(74) Attorney, Agent, or Firm—Oliff & Berridge, PLC

(57) ABSTRACT

A broach tool comprises a very stiff backing member and has an arbor adapted to be received into the hollow spindle of a machine tool, for example a multi-axis, computer controlled machining center. The backing member carries a plurality of cutting points disposed to perform successive cutting operations as the broach tool is pushed through a workpiece by relative movement of a worktable and the machine spindle. The broach tool is formed with externally extending passageways to supply coolant to the cutting points. The coolant may be supplied through the machine spindle.

6 Claims, 3 Drawing Sheets

BROACHING

The invention relates to methods and apparatus for performing broaching operations. In particular the invention concerns the performance of such methods on apparatus of the kind usually referred to as machining centers and to such apparatus adapted for performing the methods.

The normal arrangement for performing a broach operation is to mount a workpiece in position on a long bed broach machining center and to pull or push the broach tool through a roughed out slot or hole in the workpiece. The broach tool itself normally consists of a very stiff backing member or carrier carrying a plurality of cutting points one behind another and arranged so that they take progressively deeper cuts in the normal direction of travel.

Hitherto broaching operations have been carried out using special broach machines specifically designed for the purpose. Unfortunately this procedure suffers from several drawbacks: although the actual broach operation itself may be accurate, alignment errors are unavoidably introduced between preceding and succeeding operations and the broaching due to transfer of the workpiece from one machine to another. Also the zero position datum of the workpiece is inevitably lost, thus contributing a further source of potential error. Also time delays are incurred in transferring the workpiece from one machine to another and in machine setting up times. Thus, significant improvements may be obtained if broaching can be performed on the same machine as, say a grinding or milling operation, simply due to lost time saved and by preserving the zero datum.

The present invention seeks to overcome the aforementioned drawbacks by carrying out a broaching operation on a machine which is capable of performing other operations such as milling, drilling, turning, grinding, deburring and so on.

Therefore, according to one aspect of the present invention there is provided a broach tool comprising a very stiff backing member carrying a plurality of cutting points disposed to perform successive cutting operations as the broach tool is pushed through a workpiece.

Figure 1:
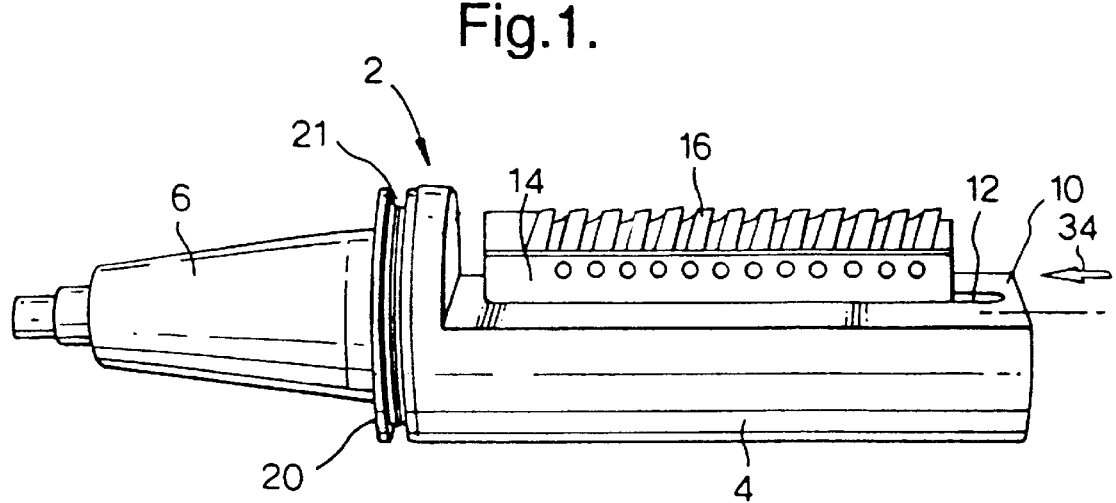
Figure 2:
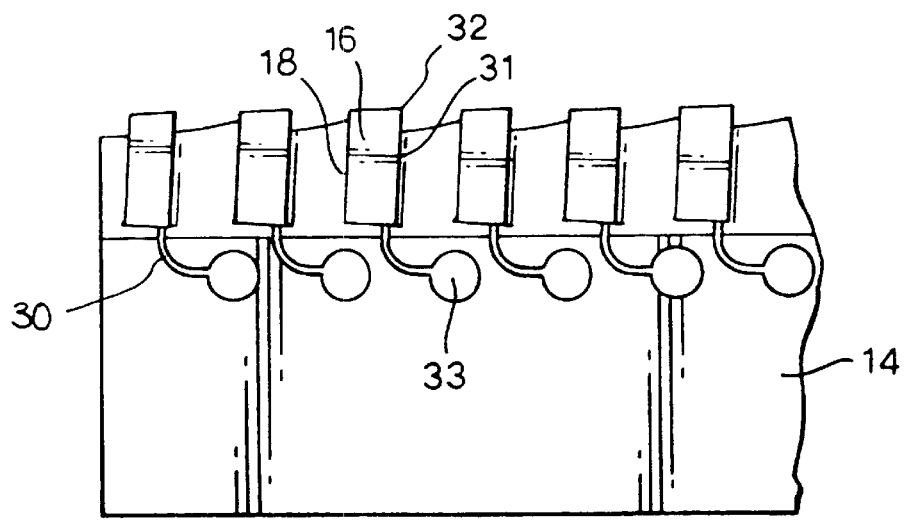
Figure 3:
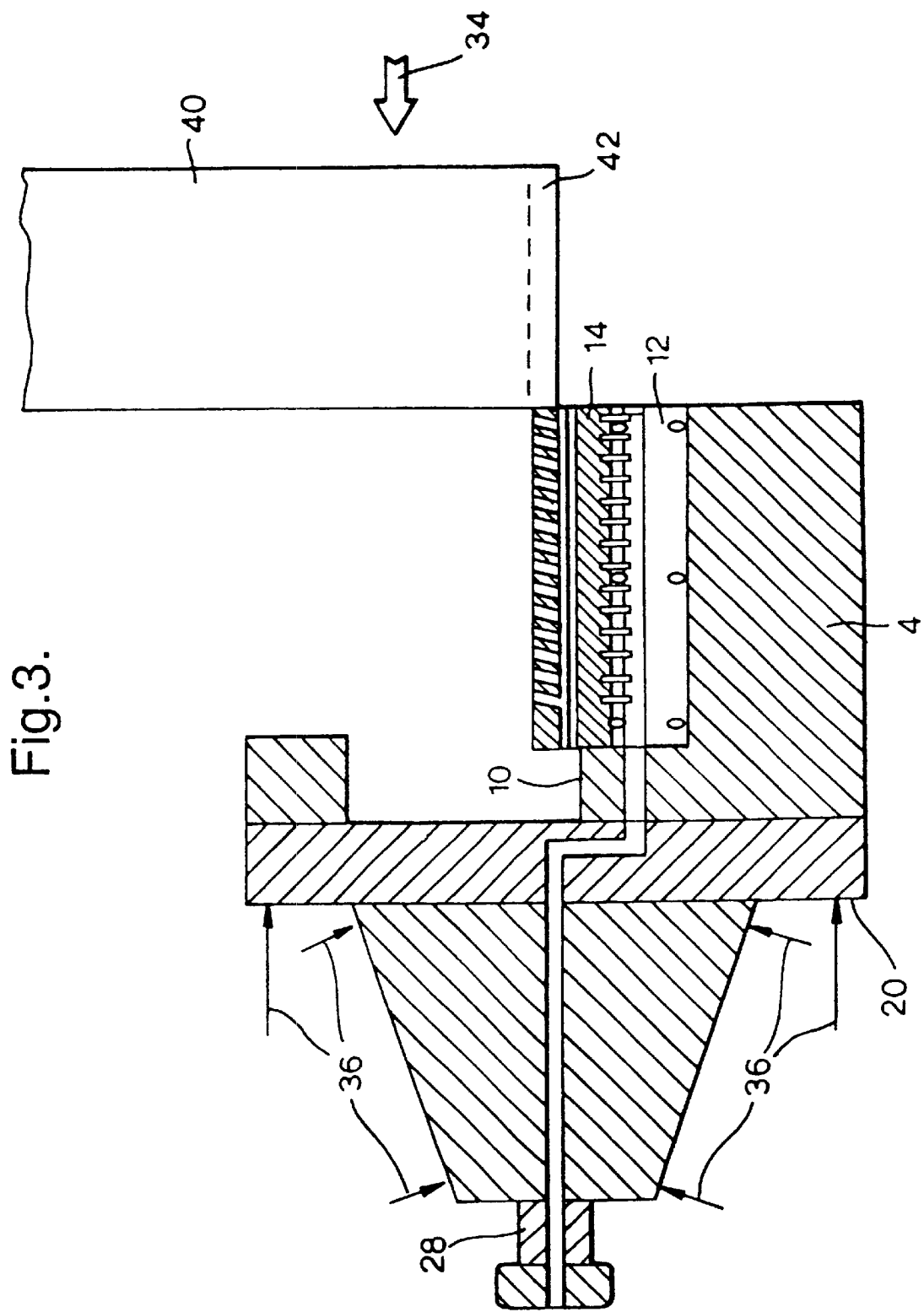
Figure 4:
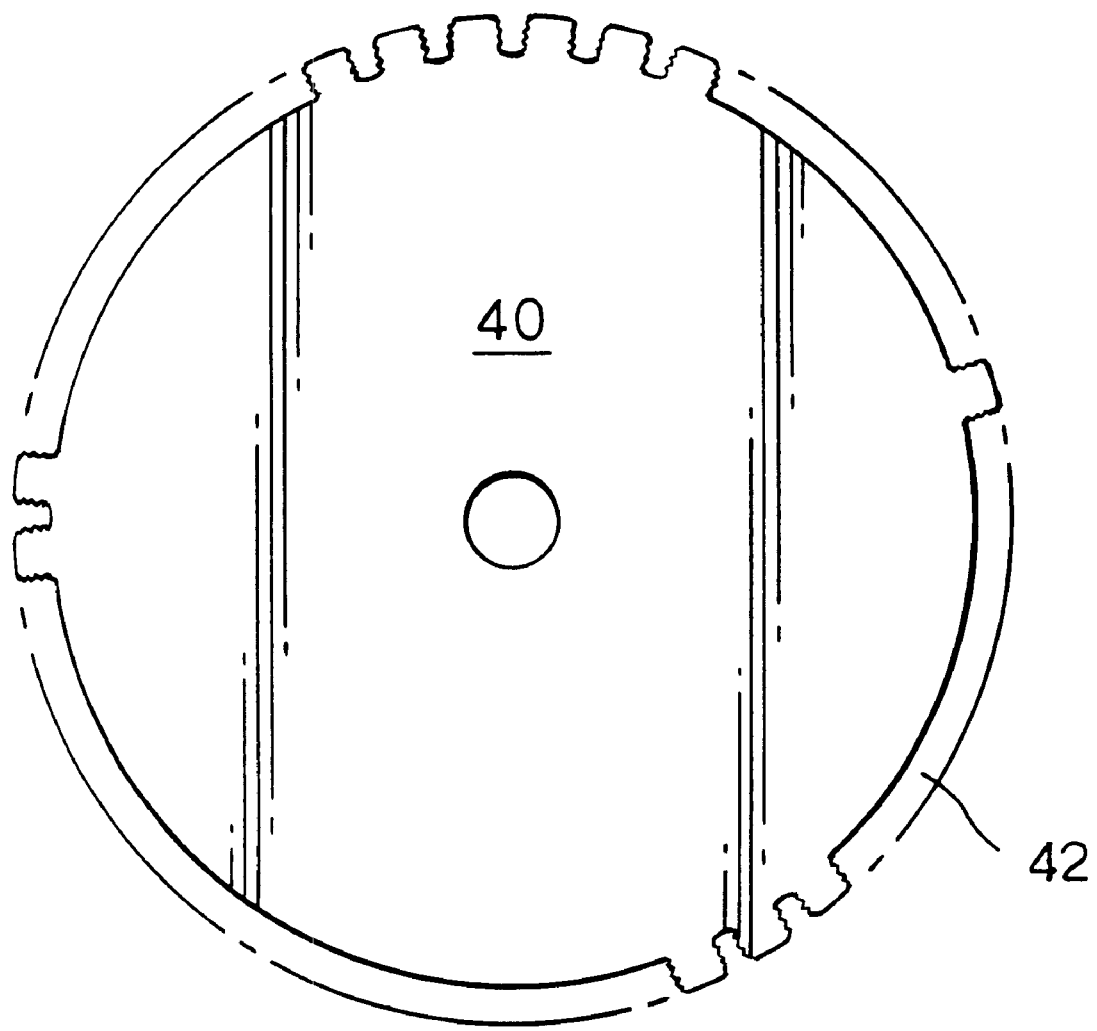

The invention and how it may be carried into practice will now be described in more detail with reference to the accompanying drawings, in which:

FIG. 1 shows a side view of a broach tool adapted for use in a machining center, FIG. 2 shows a detail of the broach tool of FIG. 1, FIG. 3 shows a section through the broach tool of FIG. 1 to illustrate in particular its internal coolant flow paths, and FIG. 4 illustrates a typical component workpiece on which the broaching operation may be carried out.

Referring to FIG. 1 the broach tool generally indicated at 2 comprises a very stiff backing member 4 formed integrally with a tapered section 6, called a tool arbor.

The backing member 4 is formed with a flat surface flat 10 on one side into which there is milled a trench 12 into which a broach bar 14 is received. The bar 14 closely fits into the trench 12 and is rigidly secured therein (by means not shown) although it may be demountable therefrom. One side of the broach bar is also upstanding from the flat surface 10 and carries on its uppermost side a plurality of hardened broach teeth 16. These teeth 16 may be formed integrally with the broach bar 14 or, as shown in FIG. 2, as individual inserts which are mounted and secured in slots 18 formed in the bar 14.

The broach tool 2 is also adapted so that the tapered arbor 6 may be mounted in a standard sized hollow spindle of a machine tool. Therefore the left side (in the drawings) of the tool 2, that is the arbor 6, is formed with a conical, male tapered section which is dimensioned to be received into a standard sized hollow spindle (not shown). Towards the base of the conical arbor 6 there is formed an annular flange 20 which in use butts against the end face of the machine tool spindle. This flange portion 20 is preferably provided with a circumferential groove 21 adapted to be engaged by a grasp of an automatic tool changer mechanism (not shown). The broach tool 2 therefore may be stored in a multi-tool carousel or store permitting the broach operation to be carried out as part of a multi-task, multi-tool sequence of operations.

Means is provided for aligning the broach tool, in particular, the orientation of the cutting teeth 16 relative to a radial datum. In one arrangement the flat surface 10 on the broach tool is measured to determine its exact orientation relative to a base datum and compensation is then calculated and applied in the machine tool control programming. Alternatively, means may be provided for physically aligning the broach tool with a reference datum.

Referring now to FIG. 3 the broach tool 2 has an axially extending passageway 28 which communicates with the base of the trench 12. The broach bar 14 is also formed with a plurality of radially extending passages 30 which open into each of the broach insert slots 18. Furthermore each of the slots 18 may be formed with a small channel 31 on the leading edge side directed at the cutting tip 32 of the teeth 16. The slots 18 and the channels 31 are supplied through coolant distribution means comprising conduits and cross drilled feed passages, indicated at 33, which are in open communication with the interior of the trench 12. In use high pressure coolant is delivered through the machine spindle into passageway 28 and thence into the trench 12 from where it reaches the feed passages 33 which supply the jets of coolant directed into the vicinity of each of the broach cutting tips 32. It is preferred to deliver the coolant at what would normally be considered very high pressure, that is at pressures of tens of bar and up to about 100 bar. The liquid coolant not only conducts heat from the broach tips and workpiece but provides lubrication and aids swarf removal, particularly at such high pressures. On a modem machining center where the workpiece volume is totally enclosed, the splash and spray from the high pressure coolant is completely contained. With such pressures present within the tool trench 12 it will be necessary to provide means for sealing between the sides and ends of the broach bar 14 and the walls of the trench 12, such sealing means is not shown in the drawings.

During a broach operation and with the broach tool 2 arbor mounted in the machine spindle the tool 2 is moved, relative to a workpiece, with a pushing motion. It is contemplated that in practice the worktable upon which a workpiece is fixed will be moved in the direction of arrow 34 in FIGS. 1 and 3. In most commonly used machine tools or machining centers the machine spindle is normally held stationary in the axial direction (usually referred to as the z-axis) and all axial and transverse movement is accomplished by worktable movements. Such machine spindles are, of course, rotatable about the z-axis or an axis parallel thereto. The forces applied to the broach tool during a broach "push" operation are necessarily reacted by the worktable fixturing holding the workpiece and by the broach tool and the machine spindle. In FIG. 3 the direction of application of these forces on the broach tool 2 is indicated by arrows 36.

FIG. 4 illustrates a practical application for the broach tool described above in the manufacture of a gas turbine engine disc 40. Around the circumference of the disc 40 there is required to be broached a multiplicity of blade root, fir-tree slots, one of which is indicated by reference numeral 42. Each of these slots is first roughed out, typically by rough broaching or in a grinding or milling operation, the slots are then finished using a broach tool as described. With a broach tool of the kind described herein all these operations may be carried out on a machining center in a continuous sequence of operations without any need to demount the workpiece. It will be understood that the broaching operation may be integrated with all other machining operations performed on the machining center, with the advantages previously mentioned. It is envisaged that one of these other operations could be the high speed grinding operation described in our earlier granted UK Patent No GB 2,332, 634. The coolant used in the grinding method described in this patent is delivered at about the 70 bar pressure mentioned above. Providing the broach tool is adapted to contain coolant at such pressure without excessive leakage, this broach tool may be successfully used alongside the grinding equipment disclosed in the patent.

What is claimed is:

1. A broach tool, comprising:
    a very stiff backing member carrying a plurality of cutting points disposed over a limited peripheral portion of the broach tool to perform successive cutting operations as the broach tool is pushed through a workpiece; and
    an arbor received into a hollow spindle of a machine tool.
2. A broach tool as claimed in claim 1, wherein the tool is formed with internally extending passageways for supply of coolant to the cutting points.
3. A broach tool as claimed in claim 1, further comprising means carried on the tool for engagement with an automatic tool changer mechanism of a machine tool or machining center.
4. A broach tool as claimed in claim 2, further comprising means carried on the tool for engagement with an automatic tool changer mechanism of a machine tool or machining center.
5. A broach tool as claimed in claim 2, wherein the internally extending passageways for the supply of coolant are arranged to receive coolant through a machine spindle.
6. A broach tool as claimed in claim 5, further comprising means carried on the broach tool for engagement with an automatic tool changer mechanism of a machine tool or machining center.

* * * * *